(12) United States Patent
Meier et al.

(10) Patent No.: US 9,300,218 B2
(45) Date of Patent: Mar. 29, 2016

(54) VOLTAGE CONTROL FOR AN OUTPUT TRANSISTOR OF A SIGNAL OUTPUT STAGE

(75) Inventors: Heinz-W. Meier, Kalletal (DE); Joerg Blanke, Lemgo (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 333 days.

(21) Appl. No.: 13/996,213

(22) PCT Filed: Dec. 20, 2011

(86) PCT No.: PCT/EP2011/073447
§ 371 (c)(1),
(2), (4) Date: Aug. 27, 2013

(87) PCT Pub. No.: WO2012/084980
PCT Pub. Date: Jun. 28, 2012

(65) Prior Publication Data
US 2015/0036391 A1 Feb. 5, 2015

(30) Foreign Application Priority Data
Dec. 21, 2010 (DE) .......... 10 2010 061 433

(51) Int. Cl.
*H03K 5/00* (2006.01)
*H02M 3/335* (2006.01)
*G08C 25/00* (2006.01)

(52) U.S. Cl.
CPC .......... *H02M 3/33576* (2013.01); *G08C 25/00* (2013.01)

(58) Field of Classification Search
None
See application file for complete search history.

(56) References Cited

U.S. PATENT DOCUMENTS

RE31,416 E * 10/1983 Olsen et al. ............. 73/862.59
2008/0304291 A1 * 12/2008 Degen et al. ............ 363/21.06

FOREIGN PATENT DOCUMENTS

| CN | 1568490 A | 1/2005 |
|---|---|---|
| DE | 3207785 | 9/1983 |
| DE | 19714552 A1 | 10/1998 |
| DE | 19756640 A1 | 2/1999 |
| DE | 10217447 | 11/2003 |

(Continued)

OTHER PUBLICATIONS

English Translation of International Search Report dated Apr. 2, 2012 corresponding to International Patent Application No. PCT/EP2011/073447, 2 pp.
English Translation of Written Opinion of the International Searching Authority dated Apr. 2, 2012 corresponding to International Patent Application No. PCT/EP2011/073447, 8 pp.

(Continued)

*Primary Examiner* — Long Nguyen
(74) *Attorney, Agent, or Firm* — Ohlandt, Greeley, Ruggiero & Perle, LLP

(57) ABSTRACT

The invention relates to a signal (feed) separator for dead-zero or live-zero measurement signals. The signal (feed) separator has a primary-side (feed) input, a secondary-side output, a direct-current transformer for transferring primary-side measurement input current, an output stage for providing a secondary-side measurement output current, and an auxiliary energy feed-in for supplying the primary side and for supplying the secondary side. The auxiliary voltage of the auxiliary energy feed-in is controlled on the secondary side by a control device with the aid of a measuring device in such a way that the power loss of the output stage is substantially independent of a load connected in the operating state.

21 Claims, 2 Drawing Sheets

(56) References Cited

FOREIGN PATENT DOCUMENTS

Figure 1:
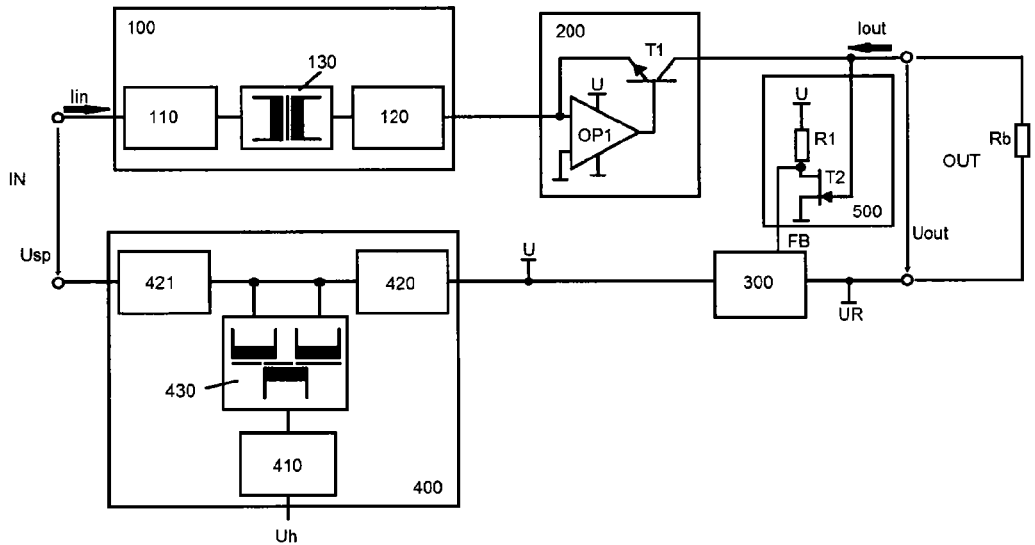

| | | |
|---|---|---|
| DE | 10057315 B4 | 11/2004 |
| DE | 10322262 | 12/2004 |
| DE | 10200706503 | 8/2008 |
| DE | 102004019142 B4 | 6/2010 |
| EP | 1553538 A1 | 7/2005 |
| WO | 0245045 A1 | 6/2002 |

OTHER PUBLICATIONS

English Translation of International Preliminary Report on Patentability dated Jun. 25, 2013 corresponding to International Patent Application No. PCT/EP2011/073447, 9 pp.

* cited by examiner

VOLTAGE CONTROL FOR AN OUTPUT TRANSISTOR OF A SIGNAL OUTPUT STAGE

Numerous signal separators and signal feed separators are known from the prior art.

These signal (feed) separators, on the input side, receive an input signal that is transferred in a manner galvanically isolated from the output. Here, an auxiliary energy circuit that provides the energy for the input and the output is generally required.

With these signal (feed) separators, in order to keep the power loss low in the case of small burdens, the supply voltage of the output stage was to be adapted to the momentary power demand. A circuit of this type is disclosed for example in DE 103 22 262. There, the auxiliary energy is fed exclusively into the signal output, and the signal input is fed from the signal output.

Other concepts, such as that from DE 10 2007 006 503, use a linear regulator and a downstream switching regulator. In this case, the output current of the DC transformer is converted via a resistor into a voltage signal, which is fed to the voltage-to-current converter of the linear regulator. The control signal is obtained by means of a comparator circuit from the collector-emitter circuit.

Both concepts have their disadvantages.

The solution in DE 103 22 262 is characterised in that the control device is a component of the auxiliary energy feed circuit. Furthermore, the control device controls the supply voltage of the output circuit itself in order to achieve a specific output voltage.

On the one hand, a design of this type is complicated and requires measuring resistors; on the other hand, the power loss of the output stage itself has to be controlled. In addition, a design with measuring resistors is prone to faults.

Furthermore, the solution from DE 10 2007 006 503 is characterised in that it requires a resistor in order to provide a voltage drop, which is converted by a current-to-voltage converter.

On the one hand, a design of this type is complicated and requires measuring resistors; on the other hand, the power loss of the output stage itself has to be controlled. In addition, a design with measuring resistors is prone to faults.

The object of the invention is therefore to provide another solution approach, which solves the disadvantages from the prior art in an inventive manner and which can be used both for a signal separator and for a signal feed separator.

The object is solved by a signal (feed) separator for dead-zero measuring signals or live-zero measuring signals. This signal (feed) separator has a primary-side (feed) input (IN), a secondary-side output (OUT), a DC transformer (100) for transferring primary-side measurement input current (Iin), an output stage (200) for providing a secondary-side measurement output current (Iout), and an auxiliary energy feed (400) for supplying the primary side and for supplying the secondary side.

The output voltage (UR) of the control device (300) is controlled with the aid of a measurement device (500) such that the power loss of the transistor (T1) of the output stage (200) is substantially independent of a burden (Rb) connected in the operating state.

In a development of the invention, the supply of the output stage (200) is provided by the auxiliary energy feed (400) and has a substantially constant voltage (U).

In a further embodiment of the invention, the measurement device (500) comprises a transistor (T2), whereby the potential of the output stage (200) is determined and the collector output signal of said transistor is provided to a feedback input (FB) of the control device (300) for control purposes.

In accordance with a further embodiment of the invention, the measurement device (500) comprises a transistor (T2), wherein the transistor (T2) is arranged such that the control of the transistor (T2) does not influence the measurement output current (Iout).

In accordance with yet a further embodiment of the invention, the auxiliary energy feed (400) comprises a DC transformer.

In accordance with a further embodiment of the invention, the auxiliary energy feed (400) comprises a DC transformer with two rectifiers (420, 421), wherein one rectifier (421) provides the supply of the primary side and the other rectifier (420) provides the supply of the auxiliary voltage to be controlled.

In yet a further embodiment of the invention, the control device (300) comprises a step-down converter.

In accordance with a further embodiment of the invention, the output stage (200) comprises a current-to-current converter (OP1).

Figure 2:
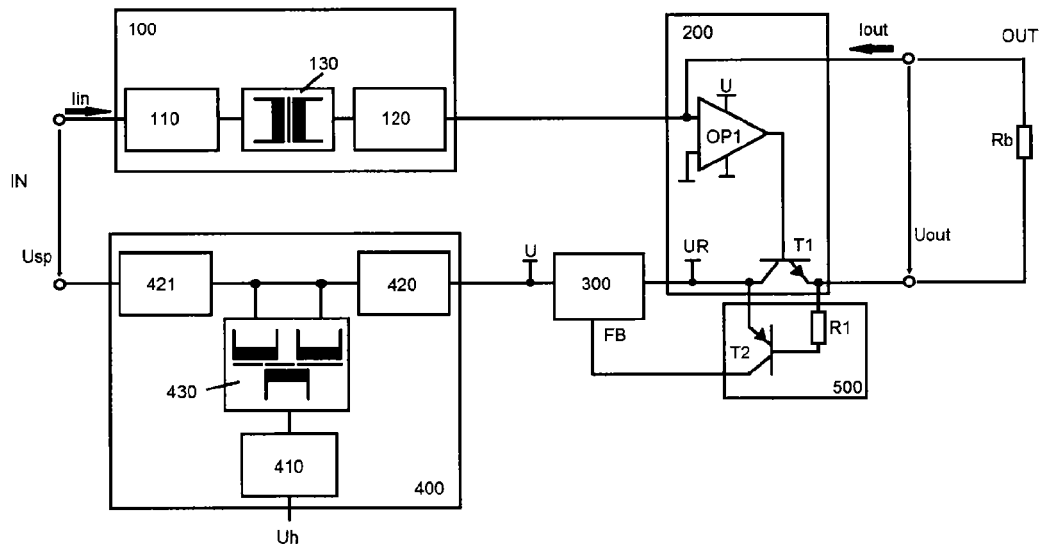
Figure 3:
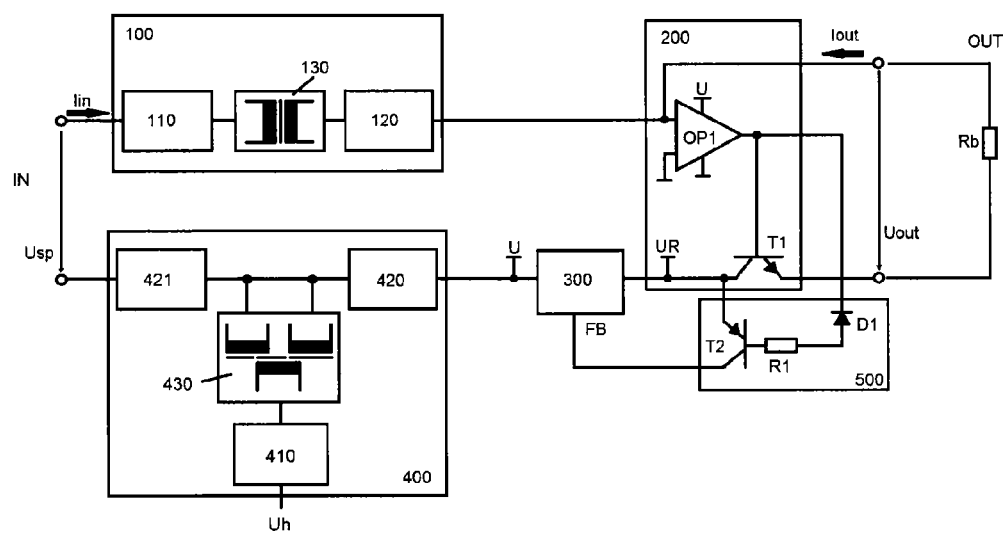

The invention will be explained in more detail hereinafter with the aid of the figures, in which:

FIG. 1 shows a schematic circuit diagram of a first embodiment of a signal feed separator according to the invention, FIG. 2 shows a schematic circuit diagram of a second embodiment of a signal feed separator according to the invention, and FIG. 3 shows a schematic circuit diagram of a third embodiment of a signal feed separator according to the invention.

In the following description, the invention will be explained in greater detail with reference to the figures; here, like reference signs generally denote equivalent means, and therefore the following description, unless stated otherwise, always relates to all figures.

A signal (feed) separator according to the invention for dead-zero or live-zero measuring signals firstly comprises a primary-side (feed) input IN and a secondary-side output OUT.

In the case of live-zero signals, a certain signal range is interpreted as an indication of a faulty function. Live-zero signals typically have a range from 4 to 20 mA, such that, when the current falls below 4 mA or exceeds 20 mA, it is assumed that the device to be measured is faulty. In this case, some units provide the possibility of emitting an alarm. The alarm may be provided both locally, for example optically and/or acoustically, and/or remotely via corresponding signal lines or messages.

Dead-zero signals generally do not have a range of this type, such that in this case it is not possible to conclude from the absence of an input current that the device to be measured is faulty. Dead-zero signals typically have a range from 0 to 20 mA.

During operation, a primary-side measurement input current Iin for example, which is driven by the feed voltage Usp, can be applied to the primary-side feed input IN.

The primary-side measurement input current Iin is then provided on the input side to a DC transformer 100 for transfer.

The transferred signal is then provided to an output stage 200 for providing a secondary-side measurement output current (Iout).

Furthermore, the signal feed separator according to the invention comprises an auxiliary energy feed 400 for supplying the primary side and for supplying the secondary side. This auxiliary energy feed Uh supplies the primary side with energy by means of Usp, whereas the secondary side is supplied with energy by means of U.

Here, Usp and U may be different voltages. Usp is preferably selected such that it can supply a two-wire transmitter, for example 16 V or more.

In all embodiments of the invention, the output voltage (UR) is controlled by a control device 300 with the aid of a measurement device 500, such that the power loss of the transistor T1 of the output stage 200 is substantially independent of a burden Rb connected in the operating state.

The supply of the output stage 200 is provided by the auxiliary energy feed 400 and has a substantially constant voltage U.

In an advantageous embodiment, the DC transformer 100 comprises a chopper 110, which chops the received measuring input signal. The chopped signal assimilates an AC signal and is then provided to a transformer 130. The transformer 130 provides a transferred chopped signal to a rectifier 120, which in turn generates a DC signal from the chopped transferred signal. Here, the transformer 130 may be a 1:1 transformer or can also provide other transfer ratios. Furthermore, the DC transformer 100 may also provide a galvanic isolation.

The output stage 200 is constructed as a current-to-current converter. To this end, the current-to-current converter may have an accordingly connected operational amplifier OP1.

In an advantageous embodiment, the auxiliary energy feed 400 comprises a DC voltage transformer. This can be constructed similarly to the DC transformer 100. Here, the auxiliary energy feed 400 comprises a chopper 410, which chops the received auxiliary voltage Uh. The chopped signal assimilates an AC voltage signal and is then provided to a transformer 430. The transformer 430 provides two transferred chopped signals.

A first chopped transferred signal is provided to a first rectifier 420, which in turn generates a DC voltage signal from the chopped transferred signal. The DC voltage signal is provided, inter alia, as a voltage U to the control device 300 or to the operational amplifier OP1 within the output stage 200.

A second chopped transferred signal is provided to a second rectifier 421, which in turn generates a DC voltage signal from the chopped transferred signal. The DC voltage signal is provided, inter alia, as a voltage Usp as a feed signal.

Here, the transformer 420 can be a 1:1 transformer for the respective voltage form the primary side to the secondary side or can also provide other transfer ratios. Furthermore, the DC voltage transformer may also provide a galvanic isolation within the auxiliary energy feed 400.

In the embodiment according to FIG. 1, the voltage required to drive the burden Rb is generated by a control device 300. This control device 300 may be a switching-mode power supply for example. Here, the output voltage of the control device 300 is controlled such that the collector potential of the output transistor T1, which is located in the output stage 200, remains constant independently of the output current Iout and of the output burden Rb. In this case, the collector potential of T1 is determined by the gate voltage of the transistor T2 of the measurement device 500. The control voltage produced at the collector of T2 is provided to the feedback input of the control device 300.

The control power of T2 is advantageously to be limited in order to minimise a falsification of the measuring signal, since the control power is removed from the measuring signal.

In the embodiment according to FIG. 2, the output transistor T1 is located on the output side of the control device 300, which again can be designed as a switching-mode power supply. Here, the transistor T2 adjusts the control voltage such that the collector-emitter potential of the output transistor T1 remains constant independently of the output current Iout and of the output burden Rb. The control voltage therefore corresponds approximately to the base-emitter potential of T2. The working point of the transistor T2 is adjusted via the resistor R1. Due to the arrangement of the output transistor T1 on the output side of the control device 300, it is ensured that the control power for the transistor T2 does not influence the measuring signal.

In the embodiment according to FIG. 3, the output voltage of the switching-mode power supply is controlled such that the output voltage is generally greater than the output voltage of the operational amplifier OP1 in the output stage 200. In this case, the value by which the output voltage is greater is generally provided from the connection in series between the emitter-base path of the transistor T2 and the diode D1.

Since, here, the control voltage generation by means of the measurement device 500 comprises no direct connection to the burden and therefore no residual current can flow through the burden Rb, the output stage 200 can set the signal current up to 0 mA.

To summarise, it can be concluded that, in the embodiments according to FIG. 2 and FIG. 3, the measurement device 500 may comprise a transistor T2, whereby the potential UR of the transistor T1 is determined. The collector output signal of the transistor T2 is provided to a feedback input FB of the control device 300 for control purposes.

To summarise further, it can be concluded that, in the embodiments according to FIG. 2 and FIG. 3, the measurement device 500 comprises a transistor T2, wherein the transistor T2 is arranged such that the control of the transistor T2 does not influence the measurement output current Iout.

LIST OF REFERENCE SIGNS primary-side input IN
secondary-side output OUT
DC transformer 100
chopper 110
rectifier 120
transformer 130
output stage 200
control device 300
auxiliary energy feed 400
chopper 410
rectifier 420, 421
measurement device 500
primary-side measurement Iin
input current
secondary-side Iout
measurement output
current
resistor R1
burden Rb
voltage U
transistor T1, T2
feedback input FB
operational amplifier OP1
diode D1
auxiliary voltage Uh
controlled output voltage UR

The invention claimed is:
1. A signal feed separator for dead-zero or live-zero measuring signals, comprising:
a primary-side feed input;
a secondary-side output;

a DC transformer having a primary side and a secondary side for transferring primary-side measurement input current supplied to the primary side to secondary side measurement output current of the secondary side;

an output stage comprising a transistor for providing the secondary-side measurement output current;

an auxiliary energy feed for supplying energy for the primary side and for supplying energy for the secondary side;

a control device for providing a controlled output voltage; and a measurement device for measuring the output voltage; wherein:

a voltage of the auxiliary energy feed is controlled on the secondary side by flail the control device with the aid of the measurement device, so that a power loss of the transistor of the output stage is independent of a burden connected to the output stage; and wherein the measurement device is configured to determine a collector potential of the transistor.

2. The signal feed separator according to claim 1, wherein the supply of the output stage is provided by the auxiliary energy feed and has a substantially constant voltage.

3. The signal feed separator according to claim 1, wherein the measurement device comprises a transistor, and wherein the transistor has an output signal to provided a feedback input of the control device for control purposes.

4. The signal feed separator according to claim 1, wherein the measurement device comprises a transistor, and wherein the transistor is arranged so that the control of the transistor does not influence the measurement output current.

5. The signal feed separator according to claim 1, wherein the auxiliary energy feed comprises a DC voltage transformer.

6. The signal feed separator according to claim 1, wherein the auxiliary energy feed comprises a DC voltage transformer with two rectifiers, and wherein one rectifier provides the supply of the primary side and the other rectifier provides the supply of the auxiliary voltage to be controlled.

7. The signal feed separator according to claim 1, wherein the control device comprises a step-down converter.

8. The signal feed separator according to claim 1, wherein the output stage comprises a current-to-current converter.

9. The signal feed separator according to claim 2, wherein the measurement device comprises a transistor, and wherein the transistor has an output signal to provide a feedback input of the control device for control purposes.

10. The signal feed separator according to claim 2, wherein the measurement device comprises a transistor, and wherein the transistor is arranged so that the control of the transistor does not influence the measurement output current.

11. The signal feed separator according to claim 3, wherein the measurement device comprises a transistor, and wherein the transistor is arranged so that the control of the transistor does not influence the measurement output current.

12. The signal feed separator according to claim 2, wherein the auxiliary energy feed comprises a DC voltage transformer.

13. The signal feed separator according to claim 3, wherein the auxiliary energy feed comprises a DC voltage transformer.

14. The signal feed separator according to claim 4, wherein the auxiliary energy feed comprises a DC voltage transformer.

15. The signal feed separator according to claim 2, wherein the auxiliary energy feed comprises a DC voltage transformer with two rectifiers, and wherein one rectifier provides the supply of the primary side and the other rectifier provides the supply of the auxiliary voltage to be controlled.

16. The signal feed separator according to claim 3, wherein the auxiliary energy feed comprises a DC voltage transformer with two rectifiers, and wherein one rectifier provides the supply of the primary side and the other rectifier provides the supply of the auxiliary voltage to be controlled.

17. The signal feed separator according to claim 4, wherein the auxiliary energy feed comprises a DC voltage transformer with two rectifiers, and wherein one rectifier provides the supply of the primary side and the other rectifier provides the supply of the auxiliary voltage to be controlled.

18. The signal feed separator according to claim 5, wherein the auxiliary energy feed comprises a DC voltage transformer with two rectifiers, and wherein one rectifier provides the supply of the primary side and the other rectifier provides the supply of the auxiliary voltage to be controlled.

19. The signal feed separator according to claim 2, wherein the output stage comprises a current-to-current converter.

20. The signal feed separator according to claim 3, wherein the output stage comprises a current-to-current converter.

21. A signal feed separator for dead-zero or live-zero measuring signals, comprising:

a primary-side feed input;

a secondary-side output;

a DC transformer having a primary side and a secondary side, the DC transformer transferring primary-side measurement input current supplied to the primary side to secondary side measurement output current of the secondary side;

an output stage comprising a transistor for providing a secondary-side measurement output current;

an auxiliary energy feed for supplying energy for the primary side and for supplying energy for the secondary side;

a control device for providing a controlled output voltage; and a measurement device for measuring the output voltage, wherein the auxiliary energy feed has a voltage that is controlled on the secondary side by the control device with the aid of the measurement device, so that the power loss of the transistor of the output stage is substantially independent of a burden connected to the output stage, wherein the auxiliary energy feed comprises a DC voltage transformer with two rectifiers, and wherein one rectifier provides the supply of the primary side and the other rectifier provides the supply of the auxiliary voltage to be controlled.

\* \* \* \* \*